United States Patent [19]

Gordon, Jr.

[11] Patent Number: 4,583,494

[45] Date of Patent: Apr. 22, 1986

[54] HEAT RECOVERY APPARATUS AND HEAT RECOVERY METHOD

[76] Inventor: Merrill K. Gordon, Jr., P.O. Box 534, Winfield, Kans. 67156

[21] Appl. No.: 703,994

[22] Filed: Feb. 21, 1985

[51] Int. Cl.[4] .............................................. F22B 33/00
[52] U.S. Cl. .................................. 122/20 B; 126/365
[58] Field of Search ................. 122/20 R, 20 A, 20 B; 126/364, 365; 237/19, 8 R

[56] References Cited

U.S. PATENT DOCUMENTS

| | | | |
|---|---|---|---|
| 681,245 | 8/1901 | Muir | 122/20 B |
| 1,885,267 | 11/1932 | Kalfus | 122/20 B |
| 4,227,647 | 10/1980 | Eriksson | 122/20 B X |

Primary Examiner—Edward G. Favors
Attorney, Agent, or Firm—John H. Widdowson

[57] ABSTRACT

A heat recovery apparatus for boilers, or the like, comprising a heat recovery housing having a gas inlet and a gas outlet disposed within the bottom and the top, respectively. A plurality of interconnected water conduit tubes is provided. A plurality of by-pass dampers pivotally connect between the pair of end walls within the heat recovery housing such that when the by-pass dampers are in a closed position, the closed by-pass dampers define a generally flat by-pass structure angularly disposed with respect to the horizontal plane. A plurality of exit dampers is pivotally connected between the pair of end walls such that when the exit dampers are in a closed position, the closed exit dampers define a generally horizontal flat exit structure extending between the pair of end walls. The process for recovering heat from hot combustion gases flowing through the combustion gas inlet comprises closing pivotally the by-pass dampers which essentially simultaneously divert or change the direction of flow of the hot combustion gases towards the water conduit tubes in order to effect a heat transfer between the hot gases and the water passing circuitously through the conduit tubes and extract condensate from the hot gases which accumulates in the bottom of the heat recovery housing. The process additionally includes opening pivotally the exit dampers to allow the passage of gases from the water conduit tubes to the combustion gas outlet, and draining accumulated condensate from the bottom of the heat recovery housing through a condensate drain.

24 Claims, 9 Drawing Figures

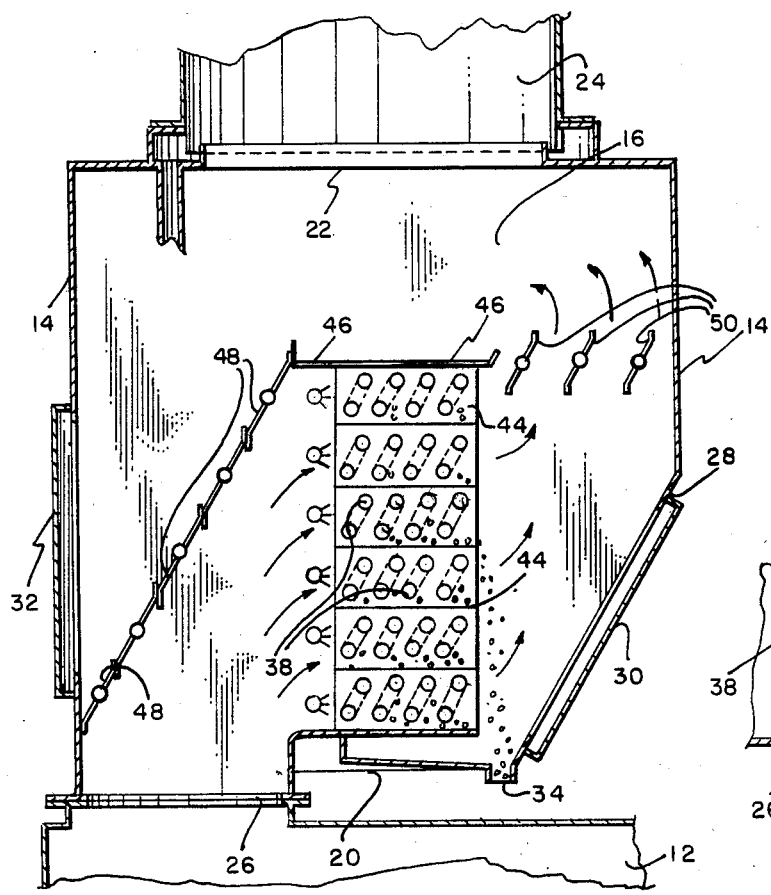
FIG. 4
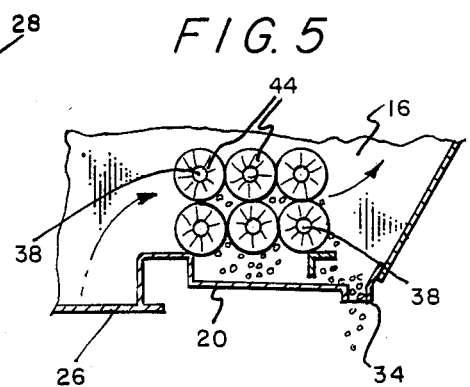
FIG. 5
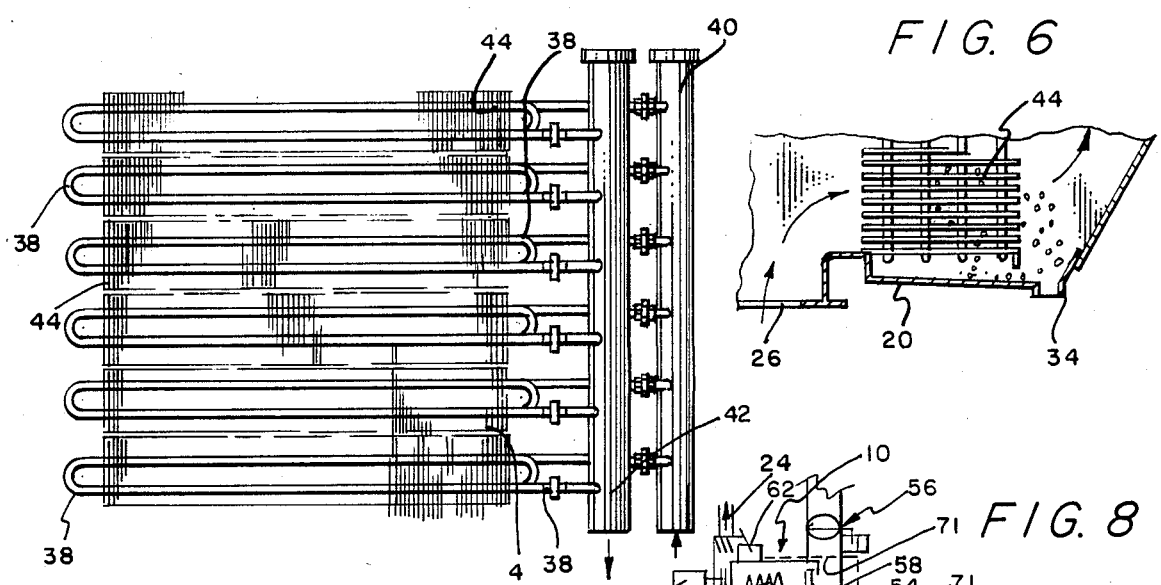
FIG. 6
FIG. 7
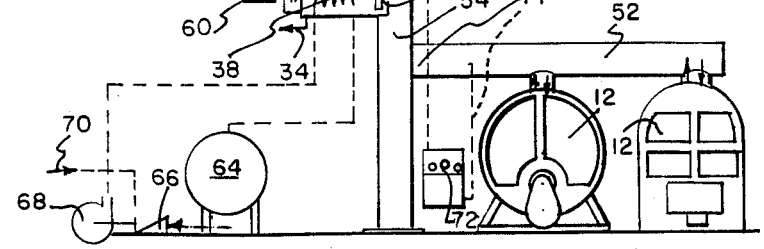
FIG. 8

HEAT RECOVERY APPARATUS AND HEAT RECOVERY METHOD

BACKGROUND OF THE INVENTION

1. Field of the Invention

This invention provides an improved heat recovery apparatus and improved method for recovering heat. More specifically, this invention contemplates a novel process for recovering heat and a novel heat recovery apparatus which divert the flow of hot combustion gases towards a heat exchanger and allows the drainage of any accumulated condenstate trickling off the heat exchanger.

2. Description of the Prior Art

U.S. Pat. No. 4,053,106 by Karl discloses a heat recovery device including a housing containing water tubes and a diverter valve that is movable in two positions. U.S. Pat. No. 4,351,276 by Kremer teaches a heat recovery device for boilers and including a housing having water coils therein and in which the housing conducts gas from the boiler outlet around the tubes to preheat the water therein. U.S. Pat. No. 2,236,170 by Fjellman depicts a flue heater for a water pipe passing through the same wherein the heater has a diverter plate which allows the flow of flue gas around the water pipe or directs the same to the outlet from the box to the flue. None of the foregoing prior art teach or suggest the particular method for recovering heat or the particular heat recovery apparatus of this invention.

SUMMARY OF THE INVENTION

This invention accomplishes its desired objects by providing a novel heat recovery apparatus for boilers, or the like, comprising a heat recovery housing generally having a pair of side walls, a pair of end walls connected to side walls, a top and a bottom. A combustion gas inlet is disposed within the bottom, and combustion gas outlet is positioned within the top. A plurality of interconnected water conduit tubes is provided with a cold water inlet in communication with one of the end walls and a cold water exit also in communication with one of the end walls. The plurality of interconnected water conduit tubes passes circuitously through the heat recovery housing. A tube roof is interconnected between the pair of end walls about the water conduit tubes, above the cold water inlet and above the hot water exit. A plurality of by-pass dampers is pivotally connected between the pair of end walls such that when the by-pass dampers are in a closed position, the closed by-pass dampers define a generally flat by-pass structure angularly disposed with respect to a horizontal plane and extending from between the pair of end walls, and also extending from one of pair of side walls up to the tube roof in order to divert or change the direction of flow of combustion gases from the combustion gas inlet toward the water conduit tubes. A condensate drain is positioned in the bottom of the heat recovery housing and underneath the water conduit tubes. A plurality of exit dampers is pivotally connected between the pair of end walls such that when the exit dampers are in a closed position, the closed exit dampers define a generally horizontal flat exit structure extending from between the pair of end walls, and from the opposed other end wall of the pair of side walls from which the by-pass dampers extend from, up to the tube roof in order to be pivotally opened to allow the flow of combustion gases from the water conduit tubes to the combustion gas outlet.

This invention also accomplishes its desired objects by providing a process for recovering heat from hot combustion gases flowing through a combustion gas inlet in a bottom of a heat recovery housing additionally having a pair of side walls, a pair of end walls, a top including a combustion gas outlet, and a plurality of inner connected water conduit tubes. The water conduit tubes are provided with a roof and a cold water inlet in communication with one of the end walls to receive cold water and hot water exit in communication with one of the end walls to dispense warm or hot water. The water conduit tubes pass circuitously through the heat recovery housing. The process includes the steps of: installing a condensate drain in the bottom of the heat recovery housing; connecting pivotally a plurality of by-pass dampers between the pair of end walls and extending from one of the pair of side walls up to the roof of the water conduit tubes; and attaching pivotally a plurality of exit dampers between the pair of end walls, and extending from the opposed side walls which the by-pass dampers extend from, to the roof of the water conduit tubes. The process additionally comprises closing pivotally the by-pass dampers which essentially simultaneously diverts or changes the direction of flow of hot combustion gases towards the water conduit tubes in order to effect a heat transfer between the hot gases and the water passing circuitously through the conduit tubes and extracting condensate from the hot gases which accumulates in the bottom of the heat recovery housing; opening pivotally the exit dampers to allow the passage of the gases from the water conduit tubes to the combustion gas outlet; and draining accumulated condenstate from the bottom of the heat recovery housing through the condensate drain.

It is an object to provide a novel heat recovery apparatus which is capable of easily being manufactured.

Still further objects of the invention reside in the provision of an improved heat recovery process.

These together with the various ancillary objects and features will become apparent as the following description proceeds, are attained by this invention, preferred embodiments being shown in the accompanying drawings by way of example only, wherein:

BRIEF DESCRIPTION OF THE DRAWINGS

FIG. 1 is a perspective view of the improved heat recovery apparatus mounted on top of a boiler, or the like;

FIG. 4 is an enlarged partial vertical sectional view taken in direction of the arrows and along the plane of line 4—4 in FIG. 3;

FIG. 5 is a vertical sectional view of an alternate fin arrangement illustrating a spiral fin wound around the heat transfer tube.

FIG. 6 is a vertical sectional view disclosing another alternate fin arrangement illustrating plate type fins layed in a horizontal plane.

FIG. 7 is an enlarged perspective view disclosing the water conduit tubes of FIG. 4 with the plurality of fins to provide for optimum heat transfer and with plate type fins layed in a vertical plane;

FIG. 8 is a schematic flow diagram of one embodiment of the invention on how the process for recovering heat operates.

DETAILED DESCRIPTION OF THE INVENTION

Figure 1:
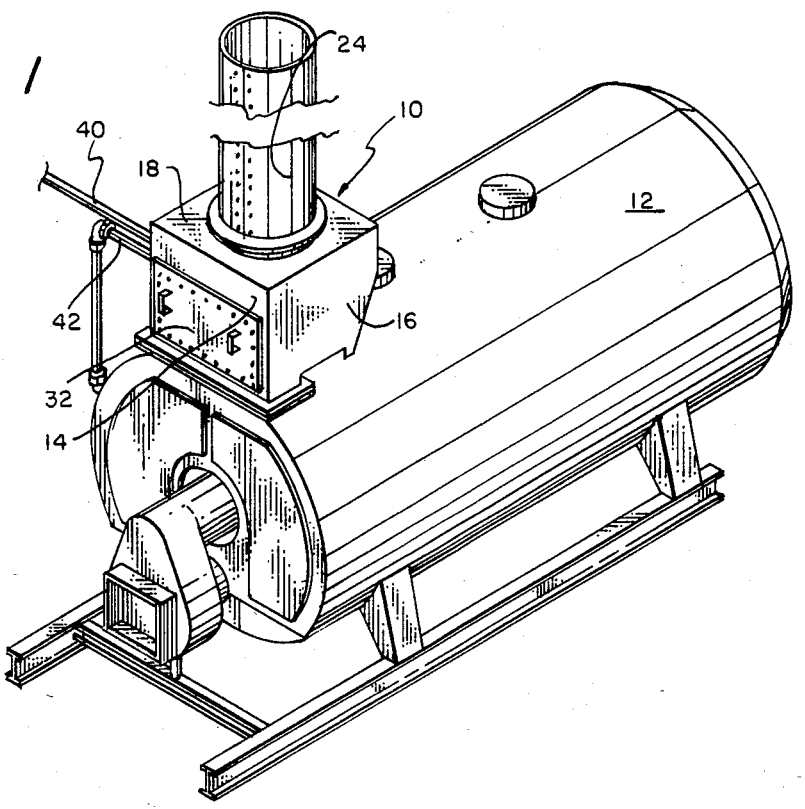
Figure 2:
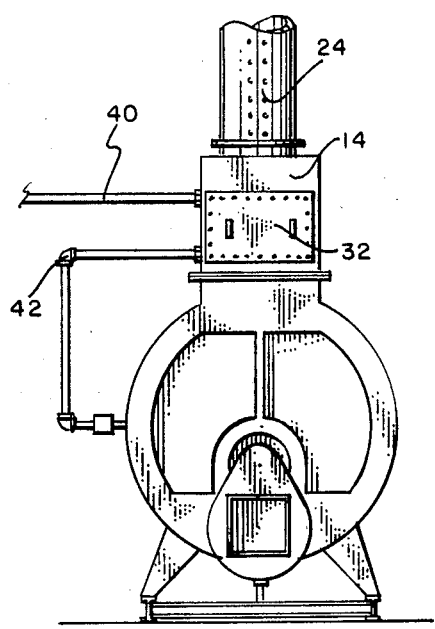
FIG. 2 is a side elevational view of the mounted improved heat recovery apparatus of FIG. 1.
Figure 3:
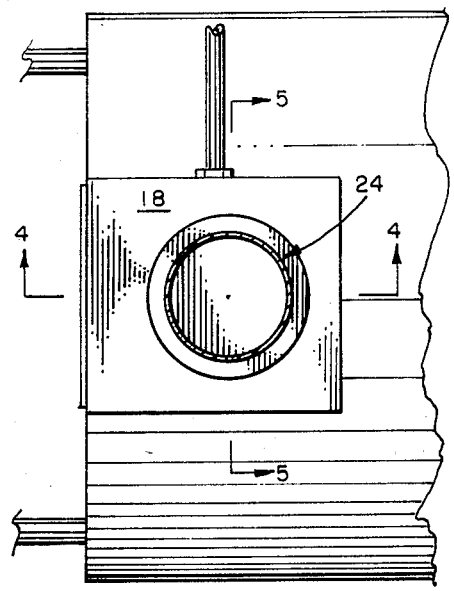
FIG. 3 is a partial top plan view of the mounted heat recovery apparatus of FIG. 1.

Referring in detail now to the drawings wherein similar parts of the invention are identified by like reference numerals and in particularly to the embodiments of FIGS. 1-7, there is seen the heat recovery apparatus of this invention, generally illustrated as 10, mounted on a boiler 12, or the like. The heat recovery apparatus 10 has a pair of side walls 14—14; a pair of end walls 16—16 connected to the side walls 14—14; a top 18 and a bottom 20, both of which are attached to the side walls 14—14 and the end walls 16—16. Top 18 includes a combustion gas outlet 22 in communication with a stack 24 which is mounted thereto; and bottom 20 has a combustion gas inlet 26 which is in communication with the products of combustion from the boiler 12. One of the side walls 14 has an angularly slanted wall section 28 with a door 30. Another door 32 is included in the side wall 14 opposed to the side wall 14 with the door 30. A condensate drain 34 is positioned in the bottom 20 of the heat recovery housing 10 at the foot of the angularly slanted wall section 28.

Passing circuitously throughout the heat recovery housing 10 is a plurality of interconnected water conduit tubes 38 which are provided with a cold water inlet 40 in communication with one of the end walls 16 and a hot water exit 42 in communication with the end wall 16. A plurality of fins 44 is mounted on and around the water conduit tubes 38 in order to obtain optimum heat transfer when hot combustion gases from the boiler 12 pass over and around the water conduit tubes 38. Fins 44 may have a spiral arrangement as illustrated in FIG. 5 or a plate type arrangement as depicted in FIGS. 6 and 7. A tube roof 46 is mounted over and is supported by the water conduit tubes 38 and interconnects the pair of end walls 16 above the water conduit tubes 38, and above the cold water inlet 40 and above the hot water exit where they pierce the end wall 16.

A plurality of by-pass dampers 48 are pivotally connected between the pair of end walls 16—16 such that when the by-pass dampers 48 are in a closed position (see FIG. 4), the closed by-pass dampers 48 define generally a flat by-pass structure angularly disposed with respect to a horizontal plane and extending between the pair of end walls 16—16 and from the side wall 14 with door 32 up to the tube roof 46 in order to divert or change the direction of flow of combustion gases through the combustion gas inlet 26 towards the water conduit tubes 38 and the surrounding fins 44. By-pass dampers 48 may be operated automatically through a mechanical means or they may be operated manually. In a preferred embodiment, closed by-pass dampers 48 are generally parallel with the angularly slanted wall section 28 of the side wall 14. Each can effect smoothly an essentially 90° change of direction of the flow of combustion gases.

A plurality of exit dampers 50 are pivotally connected between the pair of end walls 16—16 such that when the exit dampers 50 are in a closed position, the closed exit dampers define a generally flat horizontal flat structure extending between the pair of end walls 16—16 and from the side wall 14 having the slanted wall 28 to the tube roof 46 in order to be pivotally opened to allow the flow of combustion gases from the water conduit tubes 38 off the slanted wall 28 to the gas outlet 22. Exit dampers 50 may be operated automatically through a mechanical means or they may be operated manually.

Figure 9:
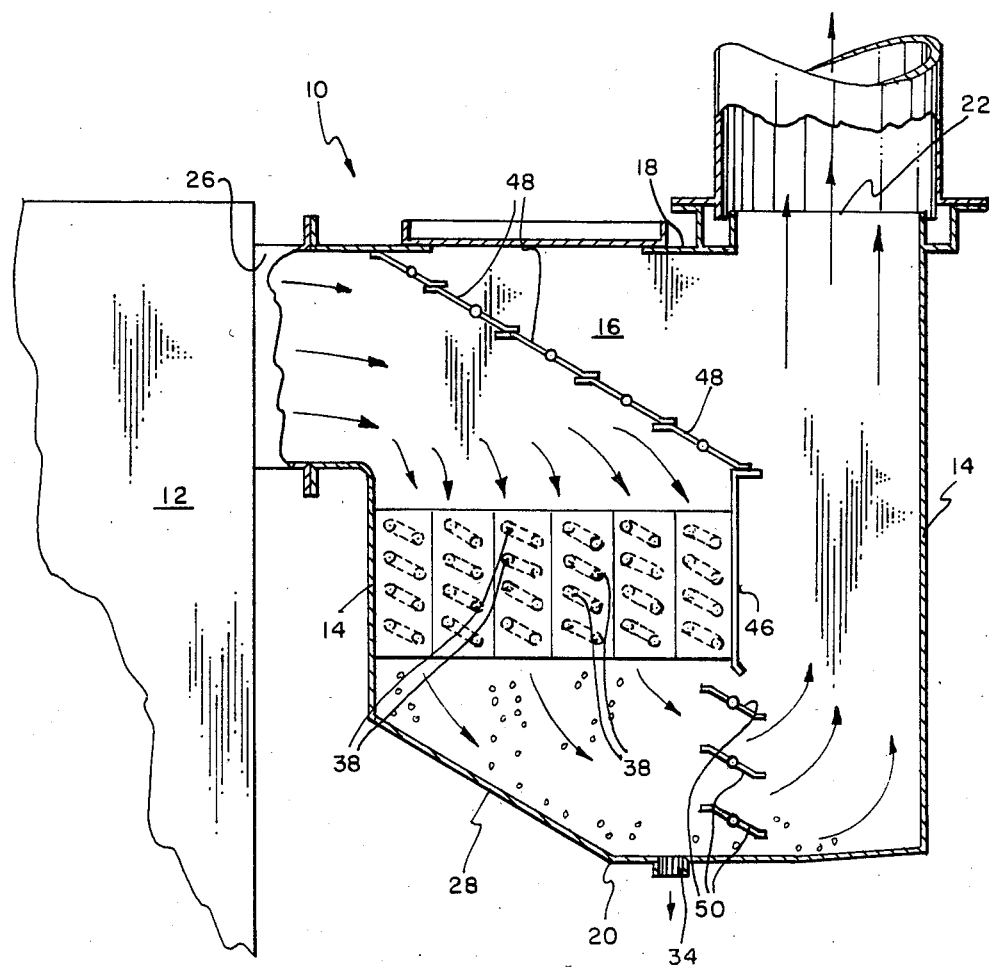
FIG. 9 is a partial vertical sectional view of another preferred embodiment of the invention, the view in the nature of that of FIG. 4 relative the preferred embodiment of that view, and wherein the inlet from the boiler is in the side of the heat recovery apparatus.

Referring now to the preferred embodiment of FIG. 9, combustion gas inlet 26 is in the side 14 (instead of the bottom 20) of heat recovery apparatus 10, and is also in communication with the products of combustion from the boiler 12. Angularly slanted section 28 is parallel to by-pass dampers 48 and is in the bottom 20 as opposed to being in one of the side walls 14—14 of the embodiment of FIGS. 1-7. Tube roof 46 from the embodiment of FIGS. 1-7 defines a tube side 46 in the embodiment of FIG. 9 and interconnects between the pair of end walls 16—16 on the side of the water conduit tubes 38 and on the side of the cold water inlet 40 and on the side of the hot water exit 42. The by-pass dampers 48 pivotally connect between the pair of end walls 16—16 and extend from the top 18 in proximity to the combustion gas inlet 26 to the tube side 46. The exit dampers 50 pivotally connect between the pair of end walls 16—16 such that when the exit dampers 50 are in a closed position, the exit dampers 50 define a generally vertical flat exit structure extending between the pair of end walls 16—16 and from the tube side 46 to the bottom 20 of the heat recovery housing in order to be pivotally opened to allow the flow of combustion gases from the water conduit tubes 38 to the combustion gas outlet 22.

FIG. 8 is a schematic flow-diagram of another embodiment of the invention, with the exhaust gases of boilers 12—12 in communication with an exhaust conduit 52 that merges with a stack 54. A motorized stack damper, generally illustrated as 56, is attached to the stack 54 for pivotally controlling the exhaust gases when no heat recovery apparatus 10 is used. However, in a preferred embodiment of the invention, heat recovery apparatus 10 is used and additionally includes an auto soot blower 58 an integrally induced draft fan motor means 60 for suction purposes off the stack 54, and an automatic draft control means 62 which is electrically draft sensorally attached via line 71 to a control panel means 72 that is also electrically draft sensorally attached (or in communication with) to the inside of exhaust conduit 52 via another line 71. Based on what the draft sensor line 71 in communication with the exhaust conduit 52 signals to control panel 72, the automatic draft control means 62 adjusts the draft through the stack 24. Pump 68 pumps 60° to 140° F. water from a hot water storage tank 64, and/or city water 70 from softener, through valve 66 around the circuitous water conduit tubes 38 and back into the hot water storage tank 64.

With continuing reference to the drawings for operation of the invention and the preferred process for recovering heat, condensate drain 34 is installed in the bottom 20 of the heat recovery housing. A plurality of by-pass dampers 48 are pivotally connected between the pair of end walls 16—16 and extend from one side wall 14 up to the roof 46 of the water conduit tubes 38 for the embodiment of FIGS. 1-7, or extend from top 18 down to the tube side 46 for the embodiment of FIG. 9. A plurality of exit dampers 50 are attached pivotally between the pair of end walls 16—16, and extend from side wall 14 (opposed to the side wall 14 which by-pass dampers 48 extend from) to the roof 46 of the water conduit tubes 38 for the embodiment of FIGS. 1–7 or extend from the tube side 46 down to the bottom 20 for the embodiment of FIG. 9. By-pass dampers 48 and exit dampers 50 may be operated manually, or preferably, automatically from a control means (such as control panel 72) in accordance with the amount of exhaust gas passing through combustion gas inlet 26 in the bottom 20. By-pass dampers 48 are parrallel to the slanted wall portion 28 for optimum angular reflection off the same after the combustion or exhaust gases leave the water conduit tubes 38.

When the by-pass dampers 48 are in an open position and when the exit dampers 50 are closed, no exhaust gases pass over the water conduit tubes 38, but passes directly through the outlet 22 and into the stack 24 which is a low-pressure drop stack because it is straight and no usual rain cap is positioned thereon. A rain cap causes considerable resistance because exiting stack gases have to turn at a 90° angle. Any rain that enters stack 24 falls down and goes out condensate drain 34.

When it is desired to direct the flow of hot gases towards the water conduit tubes 38 to effect a heat transfer between the hot gases and the water passing circuitously through the conduit tubes 38 and to extract any condensate from the hot gases which accumulate on the bottom 20 of the heat recovery housing, the by-pass dampers 48 are pivotally closed, while essentially simultaneously the exit dampers 50 are pivotally opened to allow the passage of the gases from the water conduit tubes 38 to the combustion outlet 22. As the water in the hot gases flowing over the conduit tubes 38 begins to condense out into droplets of condensate, the newly formed condenstate flows in the same direction as the dehydrated hot gases continually flowing over and around the conduit tubes 38 and fins 44. This is an important feature of the invention because it aids in the removal of the condensate from the hot gases and avoids the build-up of lime or scale that occurs when the condensate drains back toward the incoming hot gases and re-evaporates. Any condensate that accumulates in the bottom of the heat recovery housing is subsequently drained out through the condensate drain 34. Any rain water that falls down stack 24 is also drained out through the drain 34.

As the gases leave the tubes 38 and fins 44, the sloping wall portion 28 changes direction of the flow of the gases again. The change in flow direction of the gases off the closed by-pass dampers 48 and the slanted wall portion 28 is about 90°.

The by-pass dampers 48 and the exit dampers 50 may be only partially opened or closed to allow some of the hot combustion gases from the inlet 26 to exit through outlet 22 without passing over and around the water conduit tubes 38 and fins 44.

While the present invention has been described herein with reference to particular embodiments thereof, a latitude of modification, various changes and substitutions are intended in the foregoing disclosure, and it will be appreciated that in some instances some features of the invention will be employed without corresponding use of other features without departing from the scope of the invention as set forth.

I claim:

1. A heat recovery apparatus for boilers, or the like, comprising a heat recovery housing generally having a pair of side walls, a pair of end walls connected to said side walls, a top and a bottom;
a combustion gas inlet disposed within said bottom;
a combustion gas outlet positioned within said top;
a plurality of interconnected water conduit tubes provided with a cold water inlet in communication with one of said end wals and a hot water exit in communication with one of said end walls and circuitously passing through said heat recovery housing;
a tube roof interconnected between said pair of end walls above said water conduit tubes and above said cold water inlet and above said hot water exit;
a plurality of by-pass dampers pivotally connected between said pair of end walls such that when said by-pass dampers are in a closed position the closed by-pass dampers define a generally flat by-pass structure angularly disposed with respect to a horizontal plane and extending between said pair of end walls and extending from one of said pair of side walls up to said tube roof in order to divert or change the direction of flow of combustion gases frem the combustion gas inlet toward the water conduit tubes;
a condensate drain positioned in said bottom of said heat recovery housing and underneath said water conduit tubes;
a plurality of exit dampers pivotally connected between said pair of end walls such that when said exit dampers are in a closed position the closed exit dampers define a generally horizontal flat exit structure extending between said pair of end walls and from the tube roof to the opposed other wall of said pair of side walls from which said bypass dampers extend from in order to be pivotally opened to allow the flow of combustion gases from the water conduit tubes to the combustion gas outlet.

2. The heat recovery apparatus of claim 1 additionally comprising a plurality of fins mounted on and around said water conduit tubes.

3. The heat recovery apparatus of claim 2 wherein the side wall opposed to the side wall from where the by-pass dampers extend from includes an angularly slanted wall section which is generally parallel to the by-pass dampers when the same are in a closed position.

4. The heat recovery apparatus of claim 3 wherein said condensate drain is in said bottom at the foot of said angularly slanted wall section.

5. The heat recovery apparatus of claim 4 additionally comprising an auto soot blower means for impinging a gas onto the heat exchange surfaces for removing therefrom foreign materials such as soot.

6. The heat recovery apparatus of claim 5 additionally comprising an integrally induced draft fan motor means for enhancing the flow of exhaust gases off the water conduit tubes.

7. The heat recovery apparatus of claim 6 additionally comprising an automatic draft control means for regulating the flow of exhaust gases by draft fan motor means.

8. A process for recovering heat from hot combustion gases flowing through a combustion gas inlet in a bottom of a heat recovery housing additionally having a pair of side walls, a pair of end walls, a top including a combustion gas outlet, and plurality of interconnected water conduit tubes provided with a roof and a cold water inlet in communication with one of said end walls to receive cold water and a hot water exit in communication with one of said end walls to dispense warm or hot water and circuitously passing through said heat recovery housing, said process comprising the steps of:
(a) installing a condensate drain in said bottom of heat recovery housing;
(b) connecting pivotally a plurality of by-pass dampers between the pair of end walls and extending from one of said pair of side walls up to the roof of said water conduit tubes;
(c) attaching pivotally a plurality of exit dampers between the pair of end walls and extending from the opposed side wall of step (b) which said by-pass dampers extend from to said roof of said water conduit tubes;
(d) closing pivotally the by-pass dampers of step (b) which essentially simultaneously diverts or changes the direction of flow of the hot combustion gases towards the water conduit tubes in order to effect a heat transfer between the hot gases and the water passing circuitously through the conduit tubes and extract condensate from the hot gases which accumulates in said bottom of said heat recovery housing;
(e) opening pivotally the exit dampers to allow the passage of the gases from the water conduit tubes to the combustion gas outlet; and
(f) draining accumulated condensate from the bottom of the heat recovery housing through the condensate drain of step (a).

9. The process of claim 8 additionally comprising flowing the condensate in the sam direction of the flowing hot combustion gases prior to the accumulation of same in the bottom of the heat recovery housing.

10. The process of claim 9 additionally comprising draining rain water or further condensate out of the condensate drain.

11. The process of claim 10 wherein the change of direction of the flow of hot combustion gases of step (d) is about a 90° change of direction.

12. The process of claim 11 additionally comprising changing direction of flow by about 90° of the gases leaving the water conduit tubes.

13. A heat recovery apparatus for boilers, or the like, comprising;
a heat recovery housing generally having a pair of side walls, a pair of end walls connected to said side walls, a top and a bottom;
a combustion gas inlet disposed within one of said side walls;
a combustion gas outlet positioned within said top;
a plurality of interconnected water conduit tubes provided with a cold water inlet in communication with one of said end walls and a hot water exit in communication with one of said end walls and circuitously passing through said heat recovery housing;
a tube side wall interconnected between said pair of end walls on the side of said water conduit tubes and on the side of said cold water inlet and on the side of said hot water exit;
a plurality of by-pass dampers pivotally connected between said pair of end walls such that when said by-pass dampers are in a closed position, the closed by-pass dampers define a generally flat by-pass structure angularly disposed with respect to a horizontal plane and extending between said pair of end walls and extending from said top in proximity to said combustion gas inlet to said tube side wall in order to divert or change the direction of flow of combustion gases from the combustion gas inlet towards the water conduit tubes;
a condensate drain positioned in said bottom of said heat recovery housing and underneath said water conduit tubes;
a plurality of exit dampers pivotally connected between the pair of end walls such that when said exit dampers are in a closed position the closed exit dampers define a generally vertical flat exit structure extending between said pair of end walls and from the tube side to the bottom of said heat recovery housing in order to be pivotally opened to allow the flow of combustion gases from the water conduit tubes to the combustion gas outlet.

14. The heat recovery apparatus of claim 13 additionally comprising a plurality of fins mounted on and around said water conduit tubes.

15. The heat recovery apparatus of claim 14 wherein the bottom of recovery housing includes an angularly slanted wall section which is generally parallel to the by-pass dampers when the same are in a closed position.

16. The heat recovery apparatus of claim 15 wherein said condensate drain is in said bottom at the foot of said angularly slanted wall section.

17. The heat recovery apparatus of claim 16 additionally comprising an auto soot blower means for impinging a gas onto the heat exchange surfaces for removing therefrom foreign materials such as soot.

18. The heat recovery apparatus of claim 17 additionally comprising an integrally induced draft fan motor means for enhancing the flow of exhaust gases off the water conduit tubes.

19. The heat recovery apparatus of claim 18 additionally comprising an automatic draft control means for regulating the flow of exhaust gases from draft fan motor means.

20. A process for recovering heat from hot combustion gases flowing through a combustion gas inlet in the side of a heat recovery housing additionally having a pair of side walls, a pair of end walls, a top including a combustion gas outlet, and a plurality of interconnected water conduit tubes provided with a tube side and a cold water inlet in communication with one of said end walls to receive cold water and a hot water exit in communication with one of said end walls to dispense warm or hot water and circuitously passing through said heat recovery housing, said process comprising the steps of:
(a) installing a condensate drain in said bottom of heat recovery housing;
(b) connecting pivotally a plurality of by-pass dampers between the pair of end walls and extending from the top of said recovery housing down to the tube side of said water conduit tubes;
(c) attaching pivotally a plurality of exit dampers between the pair of end walls and extending from the bottom of said recovery housing up to said tube side of said water conduit tubes:
(d) closing pivotally the by-pass dampers of step (b) which essentially simultaneously diverts or changes the direction of flow of the hot combustion gases towards the water conduit tubes in order to effect a heat transfer between the hot gases and the water passing circuitously through the conduit tubes and extract condensate from the hot gases which accumulates in said bottom of said heat recovery housing;
(e) opening pivotally the exit dampers to allow the passage of the gases from the water conduit tubes to the combustion gas outlet; and (f) draining accumulated condensate from the bottom of the heat recovery housing through the condensate drain of step (a).

21. The process of claim 20 additionally comprising flowing the condensate in the same direction of the flowing hot combustion gases prior to the accumulation of same in the bottom of the heat recovery housing.

22. The process of claim 21 additionally comprising draining rain water out of the condensate drain.

23. The process of claim 22 wherein the change of direction of the flow of hot combustion gases of step (d) is about a 90° change of direction.

24. The process of claim 23 additionally comprising changing direction of flow by about 90° of the gases leaving the water conduit tubes.

* * * * *